United States Patent
Skjæveland

[11] Patent Number: 6,027,279
[45] Date of Patent: *Feb. 22, 2000

[54] FIXING CLAMP

[75] Inventor: Magne Skjæveland, Sandnes, Norway

[73] Assignee: Kverneland Klepp AS, Kvernaland, Norway

[*] Notice: This patent is subject to a terminal disclaimer.

[21] Appl. No.: 09/136,450

[22] Filed: Aug. 19, 1998

Related U.S. Application Data

[63] Continuation of application No. 08/663,114, Jun. 10, 1996.

[30] Foreign Application Priority Data

Dec. 21, 1993 [DE] Germany .................. 4343676

[51] Int. Cl.$^7$ ..................................... B25G 3/00
[52] U.S. Cl. ................ 403/378; 403/370; 403/373; 403/DIG. 9; 411/354
[58] Field of Search ................... 403/378, 380, 403/383, 373, 374, 314, 110, DIG. 9; 411/354, 400

[56] References Cited

U.S. PATENT DOCUMENTS

| | | |
|---|---|---|
| 1,737,989 | 12/1929 | Wollenschlager . |
| 2,046,942 | 7/1936 | Goeller ................................ 403/373 |
| 2,205,474 | 6/1940 | Goeller ............................ 411/354 X |
| 3,998,563 | 12/1976 | Kloeren ............................. 403/370 |
| 4,167,355 | 9/1979 | Hansson ............................ 403/374 |
| 4,354,769 | 10/1982 | Peter ............................. 403/370 X |
| 4,475,842 | 10/1984 | Onaya et al. ...................... 403/370 |
| 4,557,621 | 12/1985 | Mullenberg ......................... 403/16 |
| 5,090,833 | 2/1992 | Oertle et al. ...................... 403/12 |
| 5,536,102 | 7/1996 | Kao ............................... 403/320 |
| 5,580,201 | 12/1996 | Brilmyer .......................... 411/354 |
| 5,609,436 | 3/1997 | Jou ........................... 403/DIG. 9 X |
| 5,735,631 | 4/1998 | Patzelt et al. .................... 403/378 |
| 5,810,503 | 9/1998 | Schlanger .................. 403/DIG. 9 X |

FOREIGN PATENT DOCUMENTS

| | | |
|---|---|---|
| 80 17 767 | 7/1980 | Germany . |
| 403 176 | 7/1978 | Sweden . |
| 419 788 | 8/1981 | Sweden . |

*Primary Examiner*—Daniel P. Stodola
*Assistant Examiner*—Bruce A. Lev
*Attorney, Agent, or Firm*—Foley & Lardner

[57] ABSTRACT

A clamp having a U-shaped clamp body which engages a profile such as a rectangular pipe on three sides, while a fourth side of the profile is engaged by a bolt which is secured by a nut and extends through conical holes in the free legs of the clamp body. Conical washers on the bolt engage the conical holes on the far side from the pipe, meaning that the bolt is located eccentrically in the holes. Tightening the bolt the nut makes the clamp body squeeze the top side and the bottom side of the pipe. The conical washers in the conical holes make the bolt squeeze the pipe in the direction of the back side of the pipe. The pipe is thus squeezed from all sides.

3 Claims, 1 Drawing Sheet

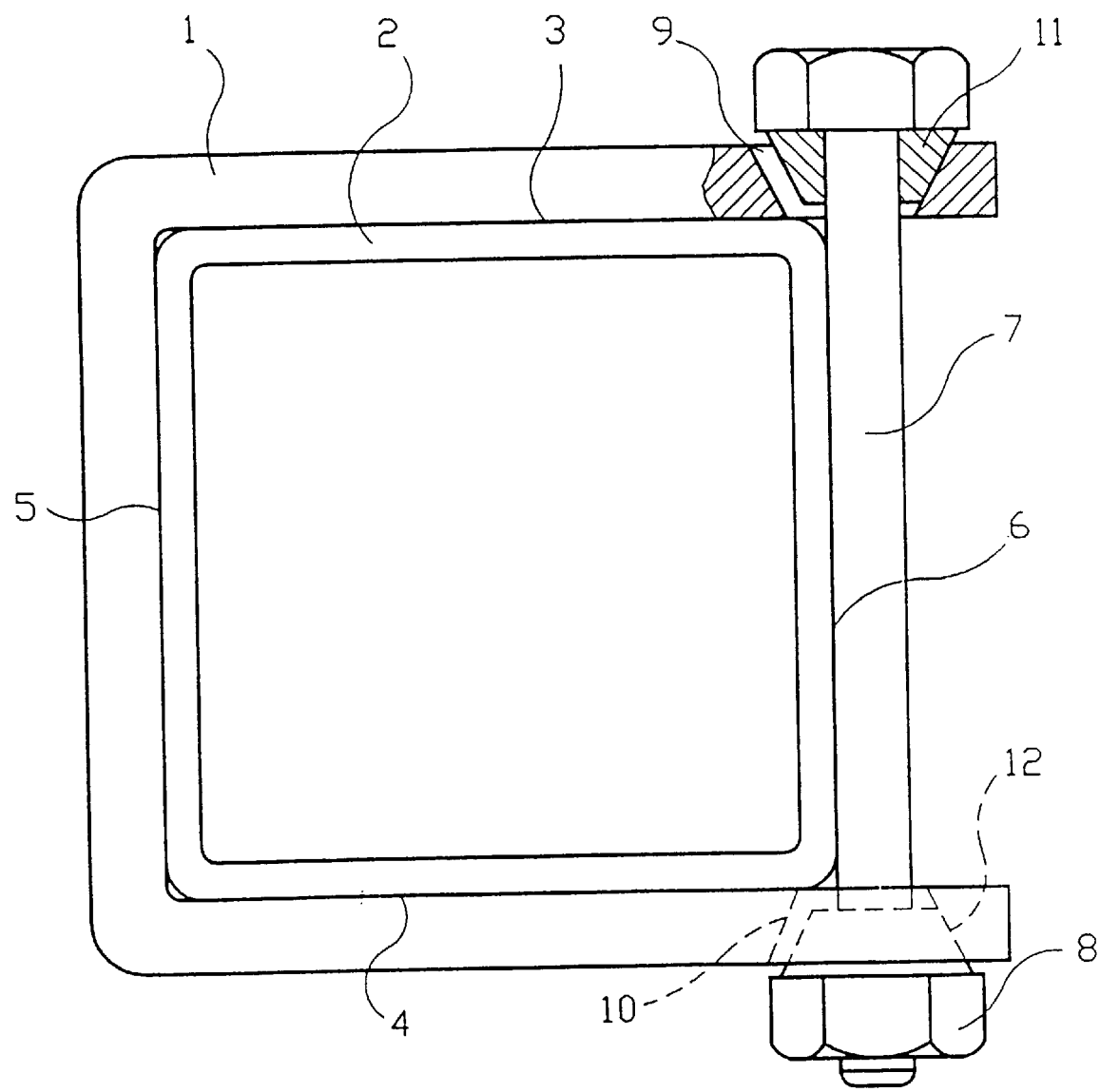

FIXING CLAMP

This is a continuation of U.S. patent application Ser. No. 08/663,114, filed Jun. 20, 1996, pending.

BACKGROUND OF THE INVENTION

1. Field of the Invention.

The invention relates to a clamp for attaching objects to pipes and other profiles.

2. Description of the Related Art

Clamps are often used for adjustable attachment of objects to pipes and other profiles. Simple clamp units normally engage only a part of the pipe or profile, and the strength of an optimal clamp connection is not achieved. More enhanced clamps tend to be more complex, often consisting of two or more parts and a number of bolts and nuts.

SUMMARY OF THE INVENTION

The purpose of the invention is to eliminate these disadvantages and bring a simple and effective clamp, especially for attaching objects to square and rectangular pipes or profiles. This purpose is achieved by means of a clamp with a web and two legs engaging the pipe on three sides, a bolt that extends through openings in the cantilevered free ends and of the legs of the clamp, and bevel edges that force the bolt towards the pipe, for instance one of the conical surfaces, surrounding the bolt, with complementary holes. Conical washers around the bolt prove particularly advantageous.

BRIEF DESCRIPTION OF THE DRAWINGS

The invention will be described in the following through an example of embodiment, with reference to the accompanying drawing.

DESCRIPTION OF THE PREFERRED EMBODIMENTS

A clamp body 1 engages a square pipe 2 on three sides, top side 3, bottom side 4 and back side 5, while the front side 6 is engaged by a bolt 7 which is secured by a nut 8 and extends through conical holes 9, 10 in the ton and bottom parts of the clamp body 1 and through conical washers 11, 12. The holes 9, 10 have a common centre line which is parallel to the front side 6. The distance between said centre line and the front side 6 is less than the bolt 7 radius, while the minimum diameter of holes 9, 10 exceeds the diameter of the bolt 7, which makes it possible to install the bolt 7. The conical washers 11, 12 on the bolt 7 engage the conical holes 9, 10 on the far side from the pipe 2, meaning that the bolt 7 is located eccentrically in the holes 9, 10. Tightening the bolt 7 makes the clamp body 1 squeeze the top side 3 and bottom side 4 of the pipe 2. The conical washers 11, 12 in the conical holes 9, 10 force the bolt 7 against the front side 6 in the direction of the back side 5 of the pipe 2. Thus the pipe 2 is squeezed from all sides, giving a strong and stable clamp connection.

The clamp body 1 may have support members for objects to be attached to the pipe 2, and it may have any number of bolts.

What is claimed is:

1. A clamp for securely attaching objects to a rectangular profile member, comprising:
    a substantially U-shaped clamp body having a web connecting two approximately parallel legs;
    a hole extending through a cantilevered free end of each leg, the holes being coaxially aligned;
    a bolt including a generally cylindrical intermediate portion and extending through the aligned holes and being provided with at least one tightening nut; and
    an inclined face supported at each end portion of the bolt and coacting with a complementary inclined face at least partially defining each of the holes;
    wherein tightening the nut displaces the legs toward one another and simultaneously the coacting faces displace the intermediate portion of the bolt toward the web.

2. A clamp as set forth in claim 1, wherein the end portions of the bolt are surrounded by the complementary inclined faces of the holes.

3. A clamp as set forth in claim 2, wherein each inclined face of the bolt comprises a conical washer extending into a respective hole.

\* \* \* \* \*